United States Patent
Cofek et al.

[15] 3,680,966
[45] Aug. 1, 1972

[54] APPARATUS AND METHOD FOR SHELL INSPECTION

[72] Inventors: Henry Robert Cofek, Fairfield; Frederick Thomas Farrace, Milford, both of Conn.

[73] Assignee: Iris Corporation, Hamden, Conn.

[22] Filed: March 12, 1971

[21] Appl. No.: 123,691

[52] U.S. Cl. .................. 356/241, 73/167, 250/218, 250/223 B, 250/237, 356/201, 356/237, 356/239
[51] Int. Cl. ...... G01n 21/16, G01n 21/32, G01l 5/14
[58] Field of Search ...... 356/201, 204, 205, 206, 237, 356/239, 240, 241; 250/218, 237, 223 B; 73/167

[56] References Cited

UNITED STATES PATENTS

| | | | |
|---|---|---|---|
| 2,402,405 | 6/1946 | Hurley, Jr. | 356/168 X |
| 2,433,558 | 12/1947 | Hurley, Jr. | 356/168 |
| 2,631,491 | 3/1953 | Ragan et al. | 356/157 |
| 3,035,480 | 5/1962 | Teucher | 356/168 |
| 3,060,747 | 10/1962 | Dunham | 356/37 |
| 3,131,815 | 5/1964 | Mathias | 250/223 B X |
| 3,309,958 | 3/1967 | Simon | 356/168 X |
| 3,479,514 | 11/1969 | Kidwell | 356/240 X |
| 3,495,915 | 2/1970 | Watson et al. | 356/241 X |
| 3,526,460 | 9/1970 | Webb | 356/204 X |

FOREIGN PATENTS OR APPLICATIONS

705,962     1941     Germany ..................... 356/241

*Primary Examiner*—Ronald L. Wibert
*Assistant Examiner*—Warren A. Sklar
*Attorney*—Sandoe, Hopgood & Calimafde

[57] ABSTRACT

Optoelectronic apparatus for inspecting the size of apertures in a shell casing includes a light source probe, having an output light diffusing element with a masked central area, for presenting a torroidal zone of constant light intensity about an aperture under test. A light receiving probe couples incident light passing through the aperture to a light detector. The electrical output of the light detector, providing a measure of aperture area, is then tested against upper and lower bounds to characterize the aperture as being of a proper or improper size.

In accordance with one aspect of the present invention, the output of the light detector is normalized to obviate the effects of light intensity variations at the source probe.

8 Claims, 2 Drawing Figures

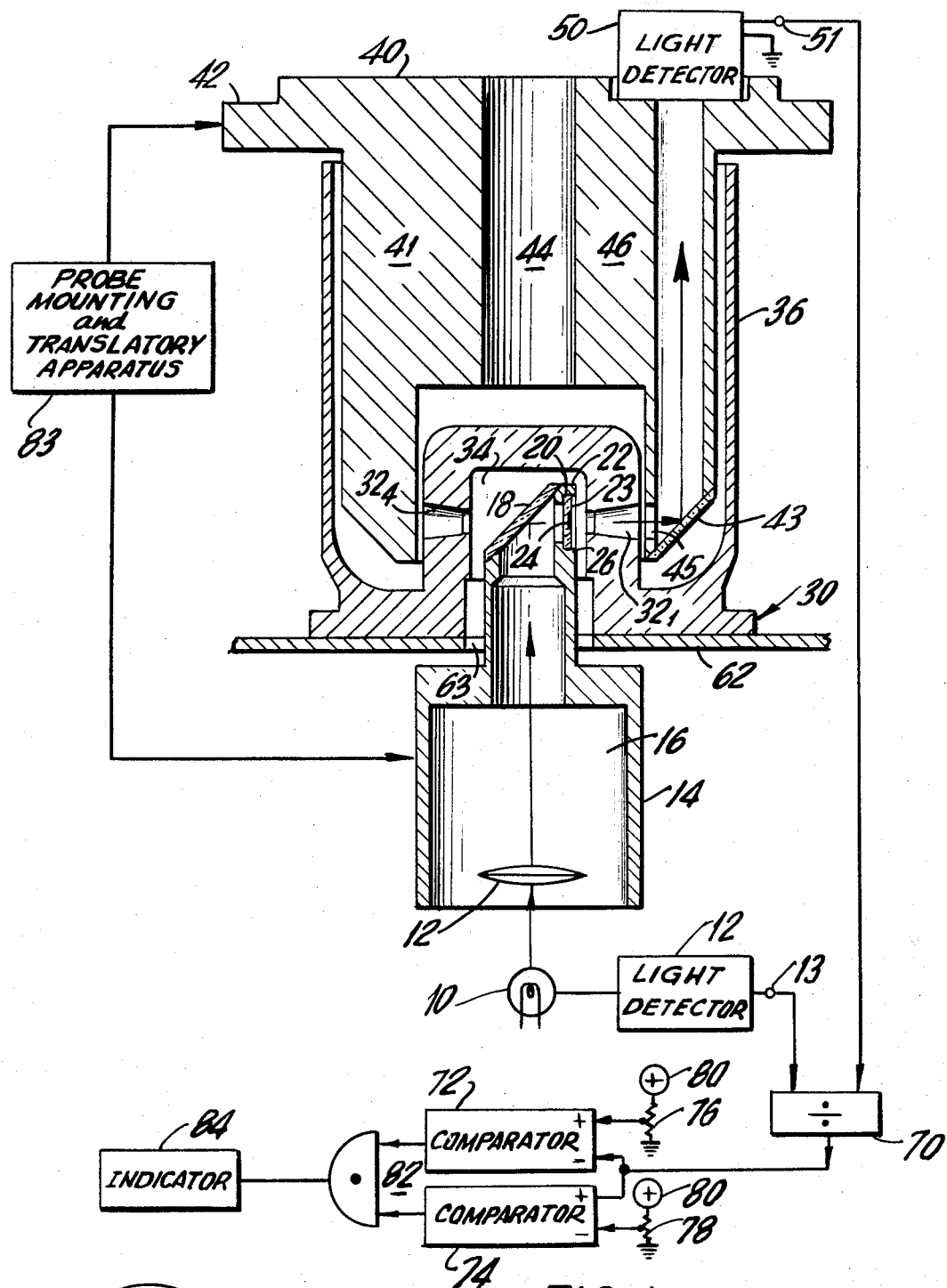
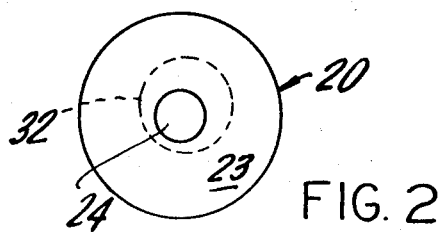
FIG. 1
FIG. 2
INVENTORS
HENRY R. COFEK
FREDERICK THOMAS FARRACE
BY Sandoe, Hopgood & Calimafde
ATTORNEYS

APPARATUS AND METHOD FOR SHELL INSPECTION

This invention relates to optoelectronic inspection apparatus and, more specifically to such apparatus employed to verify the presence, and area, of apertures included in a work piece. The invention further relates to the underlying method for aperture inspection.

It is desirable in some manufacturing processes, e.g., in the production of ammunition casings to verify that apertures required for the casing are in fact present and, moreover, are of a proper size. With particular reference to the shell context, a shell casing includes at its base a primer pocket, and a plurality of equally spaced apertures connect the pocket with the interior of the casing. When the shell is fired, the primer is detonated forming gas phase material which passes under high pressure into the interior of the casing. These expanding gasses expel the projectile initially secured to the casing with the requisite initial velocity.

If the holes are inadvertently omitted during shell casing manufacture, the firing weapon may be damaged or, in fact, explode when the defective shell is fired. This has caused fatalities in the past. Further, the size of these holes must be maintained within a relatively narrow tolerance range to ensure a sufficient and proper initial projectile velocity, and also to provide balanced accelerating forces about the projectile periphery.

It is therefore an object of the present invention to provide an improved method and apparatus for examining apertures in subject work pieces.

More specifically, an object of the present invention is the provision of optoelectronic apparatus for measuring the area of apertures in shell casings, and to the method for effecting such inspection.

The above and other objects of the present invention are realized in specific, illustrative optoelectronic inspection apparatus which includes a first, light source probe for producing a torroidal area of diffused light of uniform intensity. The light output is disposed adjacent one side of a shell aperture, and is positioned such that a masked inner, unilluminated area of the probe output is completely contained within a projection of the aperture area. A second, light receiving probe is then disposed on the alternate side of the casing, and conveys all source light passing through the casing aperture under test to a light detector.

The electrical output of the light detector, providing a measure of the area difference between that of the aperture and the dark inner portion of the torroidal light source output pattern, is then tested against limit defining upper and lower signal bounds. If both tests are satisfied, the aperture is of a proper size.

In accordance with one aspect of the present invention, the output of the signal light detector is normalized to obviate any effects of changing light intensity at the source probe.

The above and other features and advantages of the present invention are present in a specific, illustrative embodiment thereof, described in detail hereinbelow in conjunction with the accompanying drawing, in which:

FIG. 1 is a schematic view of shell casing aperture inspection apparatus in accordance with the principles of the present invention, wherein certain mechanical apparatus is shown in cross-sectional view, and FIG. 2 depicts the spacial relationship of the illuminated face of a light probe and an aperture under test for the arrangement of FIG. 1.

Referring now to FIG. 1, there is shown an optoelectronic structure for testing the area of apertures 32 disposed about a primer pocket 34 in the base of a shell casing 30. The shell casing 30 is supported on a platform 62 having an opening 63 therein which is aligned with the casing primer pocket 34. As discussed above, it is desirable as a manufacturing procedure to confirm that all apertures 32 in the shell casing 30 are present and, moreover, have an area in the relatively narrow size range required for proper projectile firing.

The aperture testing apparatus includes a first, light source probe 14 having a hollow inner recess 16. Columnated light from a light source 10 passes for further focusing through a lens 12 of any known construction. The light output of the lens 12 is directed to a mirror 18 disposed at a 45° angle with respect to the vertical optical axis of the light source probe 14 and with respect to the horizontal axis of the shell apertures 32. Light reflected by the mirror 18 impinges upon a masked light diffusing element 20, e.g., formed of opal glass. The front face of the diffusing element 20, shown in front view in FIG. 2, comprises a masked circular inner portion 24 which is adapted to be smaller than the minimum acceptable area for the aperture 32, as more fully discussed below. The masked area 24 is maintained in an unilluminated state. The light diffusing element 20 diffuses the incident light supplied thereto by the reflecting mirror 18, thereby presenting a torroidal area 23 (FIG. 2) of uniform output light intensity disposed about the masked inner area 24.

An upper light receiving probe 40, including a hollow cylindrical projecting portion 41, is adapted to fit over the shell casing portion disposed about the primer pocket. The light receiving probe 40 includes an aperture 45 for receiving light generated by the source probe light diffusing element 20, and which passes through the shell aperture under test, e.g., the aperture $32_1$ in the drawing. Light passing through the receiving probe aperture 45 is reflected by the reflecting surface of a mirror 43, advantageously disposed at an angle of 45'. The light reflected by the mirror 43 translates to a light detector 50 which provides an electrical output analog voltage at an output terminal 51 thereon having an amplitude proportional to the amount of light impinging thereon.

It is desirable to minimize the background light sensed by the light detector 50, i.e., other than that following the desired path through the shell aperture under test. To this end, the receiving probe cylindrical member 41 blocks light passing through other of the shell apertures not under test, e.g., the aperture $32_4$ shown in the drawing. The probe also includes a projecting flange portion 42 adapted to closely engage the top of the shell walls 36 to provide a light seal.

The light detector 50, and also a light detector 12 discussed below, may comprise any well-known transducer device for yielding an electrical output proportional to light input, e.g., a silicon photo-transistor, chemical light activated cell, or the like.

The light source and receiving probes 14 and 40 are disposed when operative in the relationship shown in the drawing, the light source being aligned with respect to the aperture under test (the aperture $32_1$) such that the masked area 24 is completely disposed within the facing area of aperture 32 (although not necessarily concentric therewith).

In accordance with the overall measuring principles of the FIG. 1 apparatus, the photo detector 50 provides an output voltage proportional to the amount of light, generated by the light diffusing element face portion 23 which passes through the shell aperture $32_1$ being examined. This output signal is then tested to ensure that it exceeds a minimum bond (aperture hole is present and at least equals its minimum tolerance) and that the detector output voltage does not exceed a maximum bound (aperture area does not exceed a maximum acceptable size). It is thus ideally desirable that the mask area 24 be just slightly smaller than the minimum acceptable area for the shell aperture $32_1$. Thus, assuming perfect alignment of the aperture $32_1$ and the masked area 24, the output voltage of the light detector would vary for an acceptable aperture from some very small threshold value where the minimum aperture just exceeds the masked area 24 to some upper bound, thus facilitating voltage comparison. However, the above procedure would require exact alignment of the masked area 24 vis-a-vis the aperture $32_1$, and this is impossible to attain in practice with assurance and repeatability.

Accordingly, the masked area 24 is made sufficiently small such that it is always copositioned with the opening of the aperture $32_1$ for all positioning tolerances of the source probe 14 with respect to the aperture. Thus, for example, the aperture 24 is shown in FIG. 2 as fully disposed within the projection of the aperture $32_1$ on the face of the diffusing element 20, albeit offset from a perfect coaxial position. It will be apparent that the electrical output of the light detector 50 will not vary for any relative positioning of the masked area 24 within the projection of the aperture 32 under test as long as the aperture projection fully includes the masked area 24.

The light quantum passed by the mirror 43 to the light detector 50 in the receiving probe is given by the product of the light intensity generated by the active face portion 23 of the diffuser 20 and the effective light receiving area of the aperture under test $32_1$. This effective area comprises the actual aperture area less than the fixed dark area of the masked portion 24 disposed opposite to the aperture. The electrical output of the light detector 50, present at terminal 51 thereof, in providing an electrical equivalent to this light signal, thereby provides an output yielding a direct measure of the aperture area. As the area of the masked source probe portion 24 becomes a larger percentage of the area of aperture $32_1$, the sensitivity of the light detector increases, i.e., the ratio of the detector output voltage at the upper and lower acceptable aperture bounds increases.

The voltage signal present at output 51 of the light detector 50 may be electrically tested against upper and lower bounds directly and, if both tests are satisfied, an appropriate signal generated to indicate that the aperture under investigation falls within the desired size range. However, it is observed that the output signal generated by the light detector 50 is proportional to the light intensity provided by the light diffusing element 20 which, in turn, varies with the output light provided by the light source 10. Thus, as the output light intensity from the source 10 varies, errors may be produced by reason of corresponding variations in output voltage present at the output of the light detector which depends thereon.

In accordance with one aspect of my invention the output voltage from the signal transducing light detector 50 is normalized to obviate the effects of light variations produced by the light source 10. To this end, a second light detector 12 provides an electrical output at a terminal 13 which depends upon the instantaneous light being supplied by the light source 10. The output of the detector 12 is supplied as the denominator to an analog divider circuit 70, with the numerator for the circuit 70 comprising the output voltage from the light detector 50. The quotient output from the divider circuit 70 thus normalizes the signal output from the detector 50 for variations in the output light intensity of the source 10. The output of the detector 70 hence comprises a measure of the area of the aperture 32 which does not change for variations in the output light flux from the source 10.

To characterize the aperture under test as being of a proper size, the normalized signal voltage from the divider 70 is supplied to the noninverting input terminal of a comparator 74 and to an inverting terminal of a comparator 72. The lower test bound for the aperture is effected by adjusting the tap of a potentiometer 78 which is energized by a voltage source 80. Similarly, the upper test bound for shell aperture size is dictated by the adjustment of a potentiometer 76. The comparator 74 will provide a positive output voltage only when the electrical signal characterizing the size of the aperture 32 exceeds the minimum bound specified by the adjustment of the potentiometer 78, while the comparator 72 will provide a positive output only when the electrical signal characterizing aperture size is less than the upper bound supplied by the potentiometer 76. Thus, when both of the tests effected by the comparator 72 and 74 are satisfied, each comparator supplies a proper digital signal value to a coincidence gate 82 (e.g., an AND or NAND gate, or the like). The enabled coincidence gate 82 then energizes an indicator 84 of any known construction, such as a lamp, to signal that the aperture is of proper size. If the aperture $32_1$ were not present, or were too small, a low output from comparator 74 would block the coincidence gate 82 thus suppressing any "good" indication by the device 84. Similarly, if the aperture were too large, a low output from the comparator 72 would suppress the output indication. Thus, an output display is generated only when a proper size aperture is encountered.

After one aperture 32 has been successfully tested, e.g., the aperture $32_1$, either both probes 14 and 40, or the shell 30, are rotated until the next aperture 32 to be tested is disposed between light diffusing element 20 of the source probe 14 and the aperture 45 of the receiving probe. As for all positioning of the probes 14 and 40 with respect to the shell casing 30, this positioning and rotation may be effected manually. Alternatively, any desired automated probe mounting and translating apparatus 83 may be employed to actuate the probes 14 and 40. The apparatus 83 may comprise, for example, apparatus for reciprocally inserting and withdrawing the probes for testing successive shell casing 30, and further apparatus for rotating the probes to test the plural apertures of any one shell casing.

The above method and apparatus has thus been shown to accurately and reliably examine the area of apertures in a shell casing, and to provide an output indication characterizing the area as being of proper or improper size.

The above described method and apparatus are merely illustrative of the principles of the present invention. Numerous modifications and adaptations thereof will be readily apparent to those skilled in the art without departing from the spirit and scope thereof.

What is claimed is:

1. In combination in apparatus for inspecting the area of an aperture included in a shell casing, a lower source probe for supplying an area of uniform light intensity directed toward one side of the aperture in the shell casing, said area having an unilluminated portion disposed therein, said lower source probe including light diffusing means and means for masking a portion of the surface of said light diffusing means for forming said unilluminated portion, a light source for supplying light to said diffusing means, a light receiving probe for positioning on the other side of the shell casing aperture from the lower source probe, an aperture in said light receiving probe for receiving light generated by said source probe and passing through the aperture, and a measuring light detector optionally coupled to said light receiving probe for producing an output signal proportional to the light intensity passing through the aperture in the shell casing.

2. A combination as in claim 1 further comprising means for comparing the output signal of said light detector with upper and lower bounds therefor, and means for producing an output signal dependent upon output signals generated by said comparator means.

3. A combination as in claim 2 further comprising additional light detector means for providing an output signal dependent upon the light intensity output of said light source, and means for normalizing the output of said measuring light detector with respect to variations in the output of said additional light detector means.

4. A combination as in claim 1 further comprising additional light detector means for producing an output signal dependent upon the light intensity output of said light source, and means for normalizing the output of said measuring light detector with respect to variations in the output of said additional light detector means.

5. A combination as in claim 1 further comprising means for mounting and translating said light receiving and source probes.

6. A combination as in claim 1 further comprising lens means and reflector means disposed intermediate said light source and said light diffusing means.

7. A combination as in claim 6 further comprising additional reflector means positioned in said light receiving probe intermediate said aperture in said light receiving probe and said measuring light detector.

8. A combination as in claim 3, wherein said means for normalizing comprises analog divider means.

* * * * *

UNITED STATES PATENT OFFICE
CERTIFICATE OF CORRECTION

Patent No. 3,680,966      Dated August 1, 1972

Inventor(s) H.R. Cofek and F.T. Farrace

It is certified that error appears in the above-identified patent and that said Letters Patent are hereby corrected as shown below:

Claim 1, column 5, line 28, before "source" insert --lower--;

line 29, "optionally" should have been

--optically--;

Claim 3, column 6, line 8, "providing" should have been

--producing--;

Claim 5, column 6, line 21, before "source" insert --lower--.

Signed and sealed this 23rd day of January 1973.

(SEAL)
Attest:

EDWARD M. FLETCHER, JR.
Attesting Officer

ROBERT GOTTSCHALK
Commissioner of Patents